United States Patent

Handschy et al.

[11] Patent Number: 5,900,976
[45] Date of Patent: May 4, 1999

[54] DISPLAY SYSTEM INCLUDING A POLARIZING BEAM SPLITTER

[75] Inventors: Mark A. Handschy; Noel A. Clark, both of Boulder, Colo.

[73] Assignee: Displaytech, Inc., Longmont, Colo.

[21] Appl. No.: 09/026,988

[22] Filed: Feb. 20, 1998

[51] Int. Cl.⁶ .......................... G02B 5/30; G02F 1/1335; G03B 21/28; G03B 21/14
[52] U.S. Cl. .................. 359/495; 359/487; 359/488; 359/497; 359/500; 349/96; 353/20
[58] Field of Search ..................... 359/483, 487, 359/488, 495, 497, 500; 349/96; 353/20

[56] References Cited

U.S. PATENT DOCUMENTS

| | | | |
|---|---|---|---|
| 5,157,526 | 10/1992 | Kondo et al. | 359/63 |
| 5,309,422 | 5/1994 | Kuroki et al. | 369/110 |
| 5,387,991 | 2/1995 | Mitsutaki et al. | 359/93 |
| 5,446,510 | 8/1995 | Mitsutaki et al. | 353/20 |
| 5,453,859 | 9/1995 | Sannohe et al. | 359/63 |
| 5,559,634 | 9/1996 | Weber | 359/638 |
| 5,568,290 | 10/1996 | Nakamura | 359/63 |
| 5,648,870 | 7/1997 | Mitsutake | 359/487 |
| 5,737,124 | 4/1998 | Sarayeddine | 359/487 |
| 5,748,369 | 5/1998 | Yokota | 359/487 |
| 5,751,480 | 5/1998 | Kitagishi | 359/485 |
| 5,768,015 | 6/1998 | Pattie | 359/484 |
| 5,771,122 | 6/1998 | Shuman | 359/487 |
| 5,808,794 | 9/1998 | Weber et al. | 359/487 |
| 5,828,488 | 10/1998 | Ouderkirk et al. | 359/487 |

*Primary Examiner*—Georgia Epps
*Assistant Examiner*—Margaret Burke
*Attorney, Agent, or Firm*—Jay Beyer; Stephen Shear

[57] ABSTRACT

A virtual image display system includes a reflective mode spatial light modulator, a light source for illuminating the spatial light modulator, and an optics arrangement for directing a predetermined portion of the light from the light source into the spatial light modulator and for directing certain portions of the light reflected from the spatial light modulator to a desired viewing area. The optics arrangement includes an overall polarizing beam splitter. The polarizing beam splitter has three layers of materials. The first layer is a layer of polarizing beam splitting material configured to reflect light of a first polarization and transmit light of a second polarization. The second layer is another layer of polarizing beam splitting material. The third layer is a layer of material positioned between the first and second layers of polarizing beam splitting materials. The first, second, and third layers of materials act together to form the overall polarizing beam splitter.

16 Claims, 2 Drawing Sheets

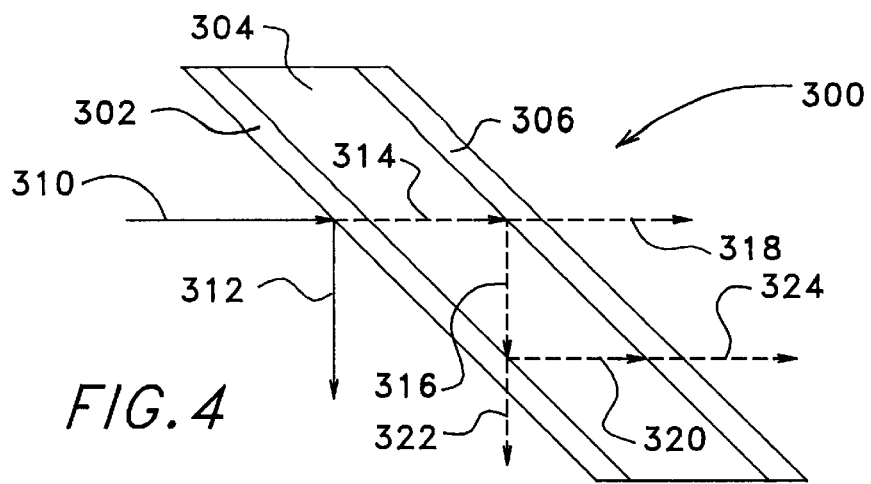
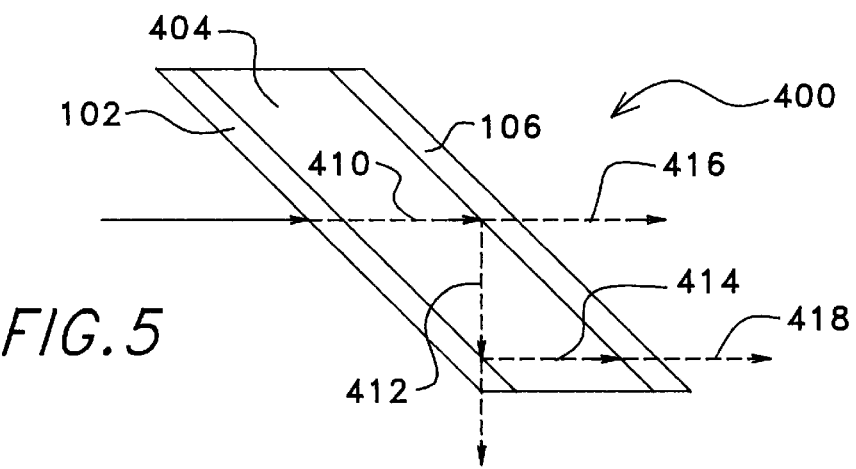
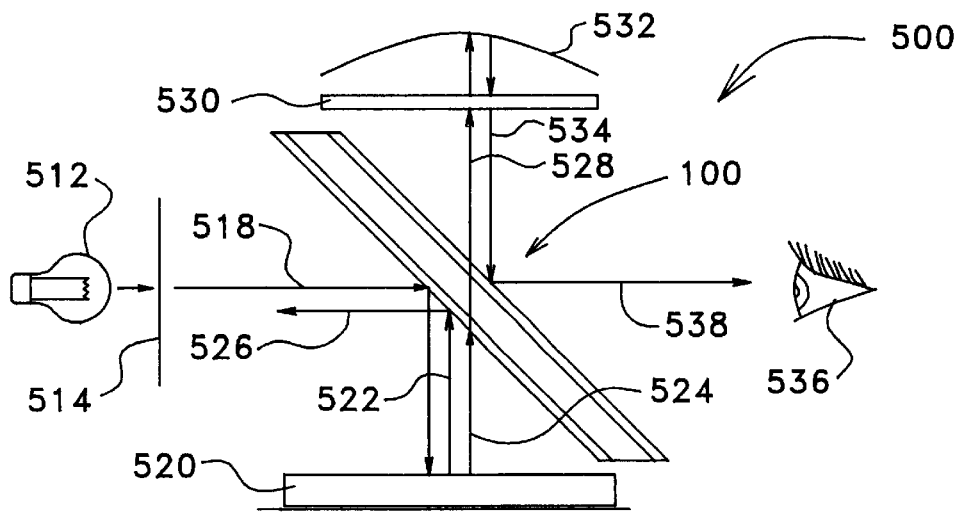

DISPLAY SYSTEM INCLUDING A POLARIZING BEAM SPLITTER

BACKGROUND OF THE INVENTION

The present invention relates generally to polarizing beam splitters and more specifically to a polarizing beam splitter for use in a liquid crystal spatial light modulator display system.

In the display industry, there is continuous pressure to produce virtual display systems with improved contrast ratios. This is a particular concern for display systems in which a liquid crystal spatial light modulator is illuminated by a light source to produce the viewable image. In many configurations of this type of virtual display system, a polarizing beam splitter is used as a main component of the optics for directing light from the light source through the system. In cases where the viewing area of the display is in line with the light source, the efficiency at which the polarizing beam splitter directs light of different polarizations through the system is critical in determining the contrast ratio of the system. U.S. Pat. No. 5,596,451 issued on Jan. 21, 1997 and entitled MINIATURE IMAGE GENERATOR INCLUDING OPTICS ARRANGEMENT, which is incorporated herein by reference, describes in detail several embodiments of such a system. For illustrative purposes, a prior art system of this type will be briefly described herein with reference to FIG. 1.

FIG. 1 illustrates a virtual image display system indicated by reference numeral 10. System 10 includes a light source 12 and a polarizer 14 for directing polarized light into a polarizing beam splitter (PBS) 16 as indicated by arrow 18. In this example, the light indicated by arrow 18 represents S-polarized light. PBS 16 reflects S-polarized light 18 into a reflective, liquid crystal spatial light modulator (SLM) 20. SLM 20 modulates the light by controllably changing the polarization of the light directed into SLM 20 thereby forming a pattern of modulated light that is reflected back into PBS 16. This pattern of modulated light from SLM 20 includes both S-polarized light as indicated by arrow 22 and P-polarized light as indicated by arrow 24. The S-polarized portion of the pattern of modulated light indicated by arrow 22 is reflected by PBS 16 back toward the light source and wasted as indicated by arrow 26. The P-polarized portion of the pattern of modulated light indicated by arrow 24 is allowed to pass through PBS 16 as indicated by arrow 28.

System 10 further includes a quarter wave plate 30 and a reflective magnifier 32. The combination of quarter wave plate 30 and reflective magnifier 32 changes the P-polarized portion of the modulated light indicated by arrow 28 into S-polarized light and reflects it back into PBS 16 as indicated by arrow 34. Since the pattern of light indicated by arrow 34 is now S-polarized light, PBS 16 reflects this pattern of light into a viewing area 36 as indicated by arrow 38 allowing this light to be viewed by a viewer.

As illustrated in FIG. 1, system 10 forms a viewable image by using SLM 20 to modulate the polarization of the light directed into PBS 16. However, because this configuration positions light source 12 in direct line with viewing area 36, the contrast ratio of the system is reduced by any of the S-polarized light indicated by arrow 18 from light source 12 which leaks through PBS 16 as indicated by dashed arrow 40. For currently available polarizing beam splitters which are designed to work over a broad spectrum of light wavelengths and over a broad range of angles of incidence, this leakage indicated by arrow 40 can be substantial.

The above described problem of leakage of light through the polarizing beam splitter has proved to make it very difficult to provide a practical color display system with a high contrast ratio using the configuration described above. This is because conventional polarizing beams splitters designed to work over a wide spectrum of light wavelengths and over a broad range of angles of incidence are not 100 percent effective and allow a substantial amount of leakage through the polarizing beam splitter. Therefore, it is desirable to provide a more efficient polarizing beam splitter which reduces this leakage problem. The present invention provides a polarizing beam splitter that works over a wide spectrum of light wavelengths and over a broad range of angles of incidence while substantially reducing or eliminating the leakage of light through the polarizing beam splitter compared to conventional polarizing beam splitters.

SUMMARY OF THE INVENTION

As will be described in more detail hereinafter, a virtual display system including a polarizing beam splitter is herein disclosed. The virtual image display system includes a reflective mode spatial light modulator, a light source for illuminating the spatial light modulator, and an optics arrangement for directing a predetermined portion of the light from the light source into the spatial light modulator and for directing certain portions of the light reflected from the spatial light modulator to a desired viewing area. The optics arrangement includes an overall polarizing beam splitter. The polarizing beam splitter has three layers of materials. The first layer is a layer of polarizing beam splitting material configured to reflect light of a first polarization and transmit light of a second polarization. The second layer is another layer of polarizing beam splitting material. The third layer is a layer of material positioned between the first and second layers of polarizing beam splitting materials. The first, second, and third layers of materials act together to form the overall polarizing beam splitter.

BRIEF DESCRIPTION OF THE DRAWINGS

The features of the present invention may best be understood by reference to the following description of the presently preferred embodiments together with the accompanying drawings.

FIG. 4 is a diagrammatic cross sectional view of a third embodiment of an overall polarizing beam splitter designed in accordance with the present invention.

FIG. 5 is a diagrammatic cross sectional view of a fourth embodiment of an overall polarizing beam splitter designed in accordance with the present invention.

FIG. 6 is a diagrammatic illustration of a display system designed in accordance with the present invention including the polarizing beam splitter shown in FIG. 2.

DETAILED DESCRIPTION OF THE PREFERRED EMBODMENTS

An invention is herein described for providing and producing a polarizing beam splitter for use in a display system. In the following description, numerous specific details are set forth in order to provide a thorough understanding of the present invention. However, in view of this description, it will be obvious to one skilled in the art that the present invention may be embodied in a wide variety of specific configurations. In order not to unnecessarily obscure the present invention, known manufacturing processes such as conventional processes used to produce polarizing beam splitting films and polarizing films will not be described in detail. Also, the various components other than a polarizing beam splitter which are used to produce a display system will not be described in detail in order not to unnecessarily obscure the present invention. These other components include, but are not limited to, light sources, polarizers, liquid crystal spatial light modulators, reflective magnifiers, and quarter wave plates. These components are known to those skilled in the art of liquid crystal spatial light modulator display systems.

Figure 2:
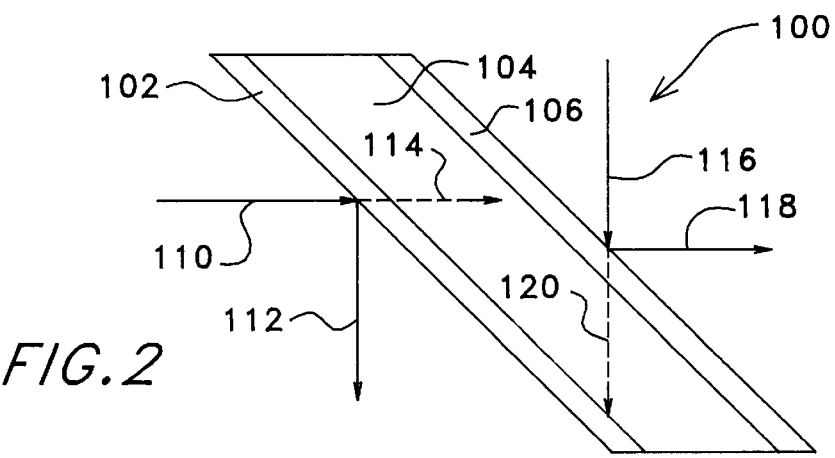
FIG. 2 is a diagrammatic cross sectional view of a first embodiment of an overall polarizing beam splitter designed in accordance with the present invention.

Referring now to FIG. 2, a polarizing beam splitter designated by reference numeral 100 and designed in accordance with the present invention will be described. In accordance with one embodiment of the invention, polarizing beam splitter (PBS) 100 is made up of three layers of material indicated by layers 102, 104, and 106. The first layer 102 and the third layer 106 of overall PBS 100 are layers of conventional polarizing beam splitting material. Polarizing beam splitter (PBS) layers 102 and 106 may be any suitable and readily providable polarizing beam splitting material such as, but not limited to, the coatings used on MacNeille cubes or cholesteric liquid crystal polymer films. Alternatively, PBS layers 102 and 106 may be reflecting polarizers such as DBEF film which is supplied by 3M Company.

In the case in which the PBS layers 102 and 106 are provided as a material such as the coatings used on a MacNeille cube or as a reflecting polarizer such as DBEFTM, PBS layers 102 and 106 both act as conventional polarizing beam splitters in that they reflect light of one linear polarization (i.e. S-polarized light) and transmit light of the opposite linear polarization (i.e. P-polarized light). Alternatively, in the case in which a cholesteric liquid crystal polymer film is used as the PBS layers 102 and 106, PBS layers 102 and 106 act on circularly polarized light allowing light of one circular polarization (i.e. right handed circularly polarized light) to pass through the layer and reflecting light of the opposite circular polarization (i.e. left handed circularly polarized light). If PBS layers which act on circularly polarized light are used, the overall PBS 100 may include quarter wave plates at certain locations in order to convert the circularly polarized light into linearly polarized light as it passes through overall PBS 100.

For some PBS materials, including reflecting polarizers such as DBEF™, the orientation of the material determines the polarization of light which is allowed to pass through the material and which polarization of light is reflected by the material. For clarity in the following description, the primary axis of these materials is defined as the axis which runs parallel to the polarization of light which is reflected by the material.

Although several specific examples of PBS materials have been described, it should be understood the present invention would equally apply regardless of the specific PBS material used for PBS layers 102 and 106. Also, although the invention will be described hereinafter in detail using the example of PBS layers that are designed to reflect S-polarized light and pass P-polarized light, this is not a requirement. Instead, it should be understood that the invention would equally apply regardless of the polarization of light reflected by the PBS layers. For example, the invention would also apply to PBS layers designed to reflect P-polarized light and pass S-polarized light or alternatively reflect a certain portion of circularly polarized light and pass other portions of the light.

In accordance with the invention, layer 104 of PBS 100 is a layer of material which is capable of absorbing or blocking at least a portion of the light which passes through layer 104. Any material may be used for layer 104 so long as the material is capable of absorbing or blocking a portion of the light which pass through the material. In one preferred embodiment, layer 104 of PBS 100 is a layer of conventional polarizing material. This polarizing material may be any conventional absorptive polarizing material such as, but not limited to, Polaroid™ type polarizing films. In the case of a Polaroid type polarizing film, the axis along which light of a particular polarization (i.e. S-polarized light) is absorbed or blocked when light of that particular polarization (S-polarized light) is directed into the polarizing material is defined as the materials primary axis.

As shown in FIG. 2, layer 104 is positioned between PBS layers 102 and 106. As mentioned above, PBS layers 102 and 106 are designed to reflect light of a particular polarization. However, as described in the background, currently available polarizing beam splitter materials which are designed to work over a broad spectrum of light wavelengths and over a broad range of angles of incidence are not capable of reflecting all of the light of the particular polarization which the PBS layers are designed to reflect. This causes leakage of light of the particular polarization through the PBS layers. As will be described in more detail below, layer 104 of overall PBS is positioned between PBS layers 102 and 106 such that layer 104 absorbs at least a portion of any light of the particular polarization which leaks through PBS layers 102 and 106.

Using the same light polarizations as described above with respect to FIG. 1 for exemplary purposes, the operation of PBS 100 will now be described in detail assuming S-polarized light is being directed into PBS 100 as indicated by arrow 10. In this example, PBS layers 102 and 106 are PBS layers designed to reflect S-polarized light and pass P-polarized light and layer 104 is a polarizing film material designed and oriented to absorb S-polarized light.

As illustrated in FIG. 2 and as described above with reference to FIG. 1, S-polarized light indicated by arrow 110 is directed into overall PBS 100. PBS layer 102 of PBS 100 reflects the majority of S-polarized light 110 as indicated by arrow 112. However, as described above in the background, some of S-polarized light 110 leaks through PBS layer 102 as indicated by dashed arrow 114 because PBS layer 102 is not 100 percent effective at reflecting the S-polarized light. This light indicated by arrow 114 which leaks through PBS layer 102 is the light which typically would cause the contrast ratio problem described in the background. However, in accordance with the invention, layer 104 is located between PBS layers 102 and 106. In this example, layer 104 is a polarizing film material that is capable of blocking the passage of substantially all of the S-polarized light. Layer 104 is positioned with its primary axis parallel to the polarization of the incoming S-polarized light so that layer 104 substantially absorbs any S-polarized light which leaks through PBS layer 102. This blocks substantially all of the S-polarized light from passing through overall PBS 100. With this configuration, overall PBS 100 acts as a polarizing beam splitter with improved efficiency with respect to preventing the problem of leakage of light through PBS 100.

In a specific case in which reflecting polarizers such as DBEF are used as PBS layers 102 and 106 and a polarizing film is used as layer 104, the relative orientations of layers 102, 104, and 106 becomes important. Because the orientation of the reflecting material determines the polarization of light which is reflected by the material, the three layers must be properly aligned. In the case in which the primary axis of the reflecting material runs parallel to the polarization of the light reflected by the reflecting material and the primary axis of the polarizing film is parallel to the polarization of the light absorbed by the film, the primary axes of all three layers should be arranged parallel to one another.

Because PBS layer 106 is located on the opposite side of layer 104 relative to PBS layer 102, any S-polarized light directed into the other side of overall PBS 100 is affected in a similar manner to that described above for the S-polarized light indicated by arrow 110. This is illustrated in FIG. 2 by arrows 116, 118, and 120. Arrow 116 represents S-Polarized light being directed into PBS layer 106. PBS layer 106 reflects the majority of S-polarized light as indicated by arrow 118. However, because PBS layer 106 is not completely effective at reflecting the S-polarized light, some S-polarized light leaks through as indicated by dashed arrow 120. In the same manner as described above, layer 104 blocks substantially all of this S-polarized light which leaks through PBS layer 106 thereby preventing substantially any of the S-polarized light from leaking through overall PBS 100. Therefore, with the above described configuration, PBS 100 blocks substantially all of the S-polarized light from leaking through overall PBS 100.

Figure 3:
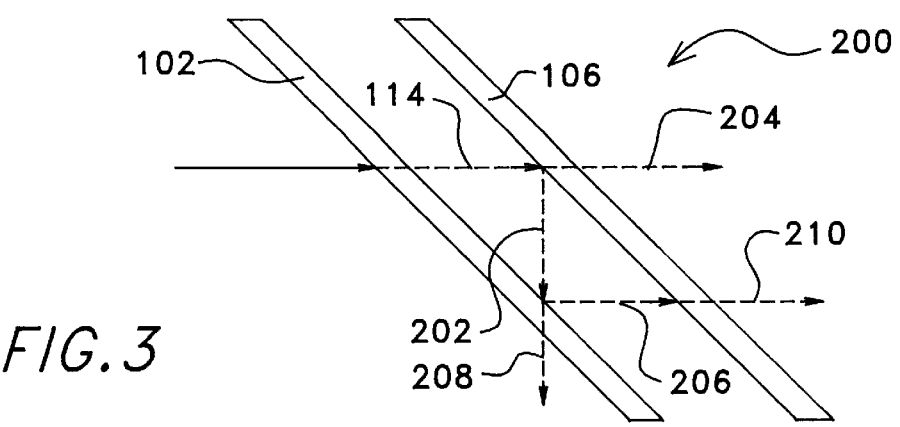
FIG. 3 is a diagrammatic cross sectional view of a second embodiment of an overall polarizing beam splitter designed in accordance with the present invention.

If layer 104 were not included in overall PBS 100, PBS 100 would function much differently. FIG. 3 illustrates the operation of an overall PBS 200 similar to PBS 100 except that layer 104 is not included. As described above for PBS 100, PBS 200 includes PBS layers 102 and 106. However, as illustrated in FIG. 3, without the presence of layer 104, any S-polarized light which leaks through PBS layer 102 (i.e. the light indicated by arrow 114) would proceed to PBS layer 106. In this situation, the majority of light 114 would be reflected as indicated by dashed arrow 202. However, some of the light indicated by arrow 114 would leak through PBS layer 106 as indicated by dashed arrow 204. In a similar manner, the majority of light indicated by arrow 202, which was reflected by PBS layer 106, would then be reflected by PBS layer 102 as indicated by dashed arrow 206. Again, some of light 202 would leak through PBS layer 102 as indicated by dashed arrow 208.

This process of reflecting the light that originally leaked through PBS layer 102 back and forth between PBS layers 102 and 106 would continue with a small percentage of the light leaking out through the PBS layers each time it is reflected. This would reduce the amount of overall leakage through PBS layer 106 since some of the original leakage indicated by arrow 114 would leak back through PBS layer 102 as indicated by arrow 208. However, although using overall PBS 200 without including a polarizing layer 104 would reduce the amount of leakage through PBS layer 106 of overall PBS 200, a substantial amount of the light indicated by arrow 114, that is the light which initially leaked through PBS layer 102, would still end up leaking through PBS layer 106 as indicated by dashed arrows 204 and 210. This overall leakage through PBS 200 when polarizing layer 104 is not included, although an improvement over conventional polarizing beam splitters, could still cause the contrast ratio problem described in the background and would not be nearly as effective as PBS 100 when polarizing layer 104 is included.

In another embodiment which produces results similar to those described above for overall PBS 200 in which layer 104 is not included, a half wave plate may be positioned between two PBS layers. FIG. 4 illustrates an overall PBS 300 including a PBS layer 302, a wave plate 304, and a PBS layer 306. With this configuration, PBS layer 302 is configured to reflect S-polarized light and PBS layer 306 is configured to reflect P-polarized light. Wave plate 304 is positioned between PBS layers 302 and 306 and is configured to act as a half wave plate as light passes through overall PBS 300. Still referring to FIG. 4, when S-polarized light indicated by arrow 310 is directed into overall PBS 300, PBS layer 302 reflects the majority of the light as indicated by arrow 312. However, as described above, a portion of the S-polarized light leaks through PBS 302 as indicated by arrow 314.

Since wave plate 304 is configured to act as a half wave plate, any S-polarized light 314 which leaks through PBS layer 302 is converted to P-polarized light. Also, since PBS layer 306 is configured to reflect P-polarized light, the majority of the light indicated by arrow 314 (which has been converted to P-polarized light by wave plate 304) is reflected back through wave plate 304 by PBS layer 306 as indicated by arrow 316. However, some of the light indicated by arrow 314 would leak through PBS layer 306 as indicated by dashed arrow 318. In a similar manner, the light indicated by arrow 318 would be converted from P-polarized light to S-polarized light as it passes back through wave plate 304. Again, the majority of light indicated by arrow 318 would then be reflected by PBS layer 302 as indicated by dashed arrow 320. As described above, some of light 318 would leak through PBS layer 302 as indicated by dashed arrow 322.

In a similar manner to that described above for FIG. 3, this process of reflecting the light that originally leaked through PBS layer 302 back and forth between PBS layers 302 and 306 would continue with a small percentage of the light leaking out through the PBS layers each time it is reflected. This would reduce the amount of overall leakage through PBS layer 306 since some of the original leakage indicated by arrow 314 would leak back through PBS layer 302 as indicated by arrow 322. However, although using wave plate 304 as a half wave plate would reduce the amount of leakage through PBS layer 306 of overall PBS 300, a substantial amount of the light indicated by arrow 314, that is the light which initially leaked through PBS layer 302, would still end up leaking through PBS layer 306 as indicated by dashed arrows 318 and 324. This overall leakage through PBS 300, although an improvement over conventional polarizing beam splitters, could still cause the contrast ratio problem described in the background and would not be nearly as effective as PBS 100 when polarizing layer 104 is included.

The embodiment of FIG. 4 illustrates one way in which the polarizations may be manipulated or changed by using various components positioned in various locations. This is one example of the many various configurations which to which the present invention may be applied.

In an alternate embodiment, layer 104 of overall PBS 100 described with reference to FIG. 2 may be a material other than polarizing material. As shown in FIG. 5, a layer 404 is positioned between PBS layers 102 and 106 which are configured in the same manner as described for FIG. 2. Layer 404 may be any material that is capable of absorbing some portion of light which leaks into layer 404. In one specific example, absorbing layer 404 takes the form of a layer of isotropic film material which partially blocks the passage of light through the film regardless of the polarization of light. Films of this type are well known in the art as neutral density filters and may be made from a variety of dyed glasses or polymers. With this configuration, the majority of the S-polarized light, indicated by arrow 410, that leaks through the PBS layers 102 would be reflected back and forth between layers 102 and 106 as indicated by arrows 412 and 414 and as described above for FIG. 3. However, since layer 404 partially absorbs or blocks the light each time it is reflected through layer 404, this configuration reduces the overall amount of light which is allowed to leak through overall PBS 400 compared to the configuration of FIG. 3 as indicated by arrows 416 and 418.

As described above, using an isotropic absorbing film for layer 404 further reduces the amount of leakage of light through overall PBS 400 compared to not including a layer of material between PBS layers 102 and 106 as described in FIG. 3. This means that a display system using this configuration of overall PBS 400 would have a further improved contrast ratio compared to conventional systems such as system 10 of FIG. 1. However, because the isotropic absorbing film blocks a portion of the light passing through it regardless of the polarization of the light, this approach reduces the efficiency of the display system by requiring a brighter light source in order to provide a display of a given brightness. In other words, the use of the isotropic absorbing film 404 improves the contrast ratio of the system at the expense of the brightness of the system. Therefore, in situations in which the brightness of the display is not a problem (i.e. a brighter light source may be easily provided), this configuration is able to provide a substantially improved contrast ratio compared to the conventional system shown in FIG. 1.

In fact, relatively small amounts of absorption in layer 404 still produce substantial improvements in the system contrast ratio. At the limit of zero absorption, the system of FIG. 4 is identical to that of FIG. 3, where the use of two PBS films instead of the one of FIG. 1 about doubles the system contrast ratio. At the opposite limit where layer 404 absorbs almost all of the light incident upon it, the system contrast ratio is improved to approximately the square of what it would be with a single PBS film. For example, with a single PBS film 16 that reflects 95% of the S-polarized light, and leaks the remaining 5%, system contrast is approximately 20:1. Using two PBS films as indicated by films 202 and 206 of FIG. 3 raises the system contrast to approximately 40:1. Using a strongly absorbing film 404, for example a film that absorbs 90% of the incident light and transmits the remaining 10%, along with two 95% reflecting PBS films 102 and 106 increases the system contrast to approximately the square of 20 or 400:1. However, in this case, the brightness of the system is reduced to approximately 10% of the original brightness. If the absorbing film absorbs only 30% of the light incident on it, system contrast is about 200:1, or approximately half the available 400:1, but now the brightness is only slightly reduced to 70% of the original brightness.

Although the isotropic absorbing film approach described with reference to FIG. 5 improves the contrast ratio, it does not work as well as PBS 100 which utilized a layer of polarizing film. This is because the polarizing film is able to absorb substantially all of the light which has leaked through the first layer of PBS material the first time the light passes through the polarizing material without substantially absorbing light of the opposite polarization. This polarizing film configuration illustrated in FIG. 2 substantially eliminates the leakage problem described in the background.

Now that the effect that the various configurations described above have on S-polarized light has been described in detail, their effect on P-polarized light will be described. As mentioned above, both PBS layers 102 and 106 are PBS layers which reflect S-polarized light and pass P-polarized light. Also, in the case in which layer 104 is a polarizing material, layer 104 is configured to block S-polarized light and allow the majority of P-polarized light to pass.

Therefore, when a polarizing film is used for layer 104, overall PBS 100 allows the majority of the P-polarized light directed into overall PBS 100 to pass through unaffected. In the case in which the middle layer of the overall PBS is an isotropic absorbing film or some other material which blocks a portion of the light passing through it regardless of the polarization of the light, the middle layer would block a certain portion of the P-polarized light as it passed through the middle layer. However, since PBS layer 102 and 106 allow P-polarized light to pass, the P-polarized light would only pass through the middle layer one time. Since the P-polarized light only passes through the middle layer one time, it is only partially absorbed one time and the remainder of the P-polarized light passes through the overall PBS.

Figure 1:
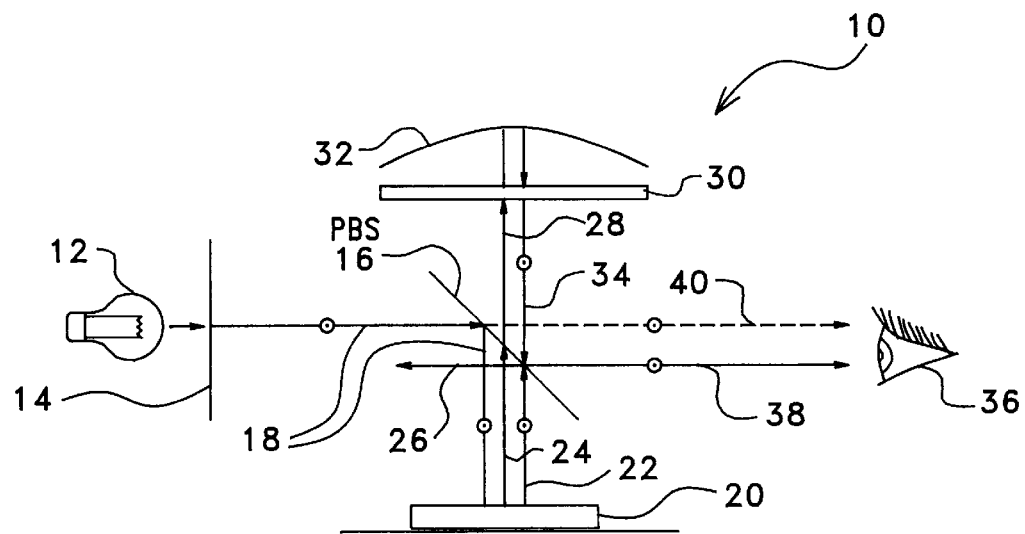
FIG. 1 is a diagrammatic illustration of a prior art display system.

FIG. 6 illustrates a virtual image display system indicated by reference numeral 500 similar to system 10 of FIG. 1. However, in accordance with the present invention, system 500 includes an overall PBS such as those described above instead of a conventional polarizing beam splitter. In this specific example, system 500 includes overall PBS 100 which was described with reference to FIG. 2.

As illustrated in FIG. 6, system 500 includes a light source 512 and a polarizer 514 for directing polarized light into a PBS 100 as indicated by arrow 518. In this example, the light indicated by arrow 518 represents S-polarized light. PBS 100 reflects the majority of S20 polarized light 518 into a spatial light modulator (SLM) 520. In one preferred embodiment, SLM 520 is a reflective mode ferroelectric liquid crystal spatial light modulator. SLM 520 modulates the light by controllably changing the polarization of the light directed into SLM 520 thereby forming a pattern of modulated light that is reflected back into PBS 100. This pattern of modulated light from SLM 520 includes both S-polarized light as indicated by arrow 522 and P-polarized light as indicated by arrow 524. The S-polarized portion of the pattern of modulated light indicated by arrow 522 is reflected by PBS 100 back toward the light source and wasted as indicated by arrow 526. The P-polarized portion of the pattern of modulated light indicated by arrow 524 is allowed to pass through PBS 100 as indicated by arrow 528.

The action of SLM 520 has been described as modulating the polarization of reflected light so that image information is conveyed as the pattern of S-polarized and P-polarized light.

Alternatively, other types of reflective SLMs may be used so long as the light reflected from the SLM is polarized oppositely from the light illuminating the SLM. This can be accomplished with many types of SLMs that don't otherwise act on the light's polarization, such as movable mirror SLMs, by interposing a quarter-wave plate between the SLM and the rest of the optical system.

System 500 further includes a quarter wave plate 530 and a reflective magnifier 532.

The combination of quarter wave plate 530 and reflective magnifier 532 changes the P-polarized portion of the modulated light indicated by arrow 528 into S-polarized light and reflects it back into PBS 100 as indicated by arrow 534. Since the pattern of light indicated by arrow 534 is now S-polarized light, PBS 100 reflects this pattern of light into a viewing area 536 as indicated by arrow 538 allowing this light to be viewed by a viewer.

Because system 500 includes PBS 100 as described above with reference to FIG. 2, the leakage problem and the contrast ratio problem described in the background are substantially reduced or eliminated. This is because PBS 100 substantially reduces or eliminates the leakage of S-polarized light through PBS 100. The substantial reduction or elimination of leakage dramatically improves the contrast ratio of system 500 when compared to conventional system 10 of FIG. 1.

Although various layers of PBS 100 have been described as reflecting and blocking S-polarized light, this is not a requirement of the invention. Instead, it should be understood that these layers may be configured to act on any particular polarization of light. For example, these layers may be configured to act on P-polarized light or a certain portion of circularly polarized light rather than S-polarized light and still remain within the scope of the invention. Also, although only one specific embodiment of the invention has been described above in detail, it is to be understood that the present invention may be embodied in a wide variety of alternative forms and still remain within the scope of the invention. Any of these various embodiments would equally fall within the scope of the invention so long as a material for blocking at least a portion of light is sandwiched between two layers of polarizing beam splitting materials.

Furthermore, although only one specific configuration of a display system using the novel polarizing beam splitter has been described, it is to be understood that the present invention would equally apply to any display system which utilizes a polarizing beam splitter in accordance with the invention.

Although the polarizing beam splitter and display system have been described with their various components having particular respective orientations and the light used by the system has been described as having particular polarization states, it should be understood that the present invention may take on a wide variety of specific configurations with the various components being located in a wide variety of positions and mutual orientations and the light having a variety of different polarization states and still remain within the scope of the present invention. Copending U.S. patent application Ser. Nos. 08-362,665 and 08-362,234, both filed Dec. 22, 1994, and respectively entitled ACTIVE MATRIX LIQUID CRYSTAL IMAGE GENERATOR and OPTICS ARRANGEMENTS INCLUDING LIGHT SOURCE ARRANGEMENTS FOR AN ACTIVE MATRIX LIQUID CRYSTAL IMAGE GENERATOR, both of which are incorporated herein by reference, describe some of these various configurations of display systems to which the invention may be applied. Therefore, the present examples are to be considered as illustrative and not restrictive, and the invention is not to be limited to the details given herein, but may be modified within the scope of the appended claims.

What is claimed is:

1. A virtual image display system comprising:
    a reflective spatial light modulator;
    a light source for illuminating the spatial light modulator; and
    an optics arrangement for directing a predetermined portion of the light from the light source into the spatial light modulator and for directing certain portions of the light reflected from the spatial light modulator to a desired viewing area, the optics arrangement including an overall polarizing beam splitter, the polarizing beam splitter having
        a first layer of polarizing beam splitting material configured to reflect light of a first polarization and transmit light of a second polarization,
        a second layer of polarizing beam splitting material, and
        a third layer of material configured to absorb at least a portion of any light passing through the third layer positioned between the first and second layers of polarizing beam splitting materials, the first, second, and third layers of materials acting together to form the overall polarizing beam splitter.

2. A display system according to claim 1 wherein the second layer of polarizing beam splitting material is configured to reflect light of the first polarization and transmit light of the second polarization.

3. A display system according to claim 2 wherein the third layer of material positioned between the first and second layers of polarizing beam splitting materials preferentially absorbs light of the first polarization.

4. A display system according to claim 2 wherein the third layer of material positioned between the first and the second layers of polarizing beam splitting materials is a layer of polarizing material configured to absorb light of a given polarization.

5. A display system according to claim 4 wherein the layer of polarizing material has a primary axis parallel to the given polarization of light the layer of polarization material absorbs, wherein the given polarization of light the layer of polarization material absorbs is light of the first polarization which is reflected by the first and second layers of polarizing beam splitting material, and wherein the layer of polarizing material is positioned such that the primary axis of the layer of polarizing material is parallel to the first polarization of light such that the layer of polarizing material absorbs substantially all of the light of the first polarization which leaks through either the first or the second layer of polarizing beam splitting material.

6. A display system according to claim 1 wherein the third layer of material is a layer of isotropic absorbing film.

7. A display system according to claim 1 wherein the spatial light modulator is a reflective mode liquid crystal spatial light modulator.

8. A display system according to claim 7 wherein the spatial light modulator is a reflective mode ferroelectric liquid crystal spatial light modulator.

9. A display system according to claim 1 wherein the optics arrangement further includes a reflective magnifier.

10. A display system according to claim 9 wherein the reflective magnifier includes an optical element for converting any light directed into the reflective magnifier from its initial polarization to its opposite polarization.

11. A virtual image display system comprising:
    a reflective spatial light modulator;
    a light source for illuminating the spatial light modulator; and
    an optics arrangement for directing a predetermined portion of the light from the light source into the spatial light modulator and for directing certain portions of the light reflected from the spatial light modulator to a desired viewing area, the optics arrangement including an overall polarizing beam splitter, the polarizing beam splitter having
        a first layer of polarizing beam splitting material configured to reflect light of a first polarization and transmit light of a second polarization, a second layer of polarizing beam splitting material configured to reflect light of the second polarization and transmit light of the first polarization, a third layer of material positioned between the first and second layers of polarizing beam splitting materials configured to act as a wave plate capable of changing the polarization of light passing through the wave plate, the first, second, and third layers of material acting together to form the overall polarizing beam splitter.

12. A display system according to claim 11 wherein the wave plate is configured to act as a half wave plate for light passing through the wave plate between the first and second polarizing beam splitting layers.

13. A display system according to claim 11 wherein the spatial light modulator is a reflective mode liquid crystal spatial light modulator.

14. A display system according to claim 13 wherein the spatial light modulator is a reflective mode ferroelectric liquid crystal spatial light modulator.

15. A display system according to claim 11 wherein the optics arrangement further includes a reflective magnifier.

16. A display system according to claim 15 wherein the reflective magnifier includes an optical element for converting any light directed into the reflective magnifier from its initial polarization to its opposite polarization.

* * * * *